(Model.)

F. A. BUELL.

SAW HANDLE.

No. 281,447. Patented July 17, 1883.

WITNESSES:
Donn Twitchell.
C. Sedgwick

INVENTOR:
F. A. Buell
BY Munn & Co
ATTORNEYS.

UNITED STATES PATENT OFFICE.

FRANK A. BUELL, OF BROOKLYN, NEW YORK, ASSIGNOR TO THE HARVEY W. PEACE COMPANY, (LIMITED,) OF SAME PLACE.

SAW-HANDLE.

SPECIFICATION forming part of Letters Patent No. 281,447, dated July 17, 1883.

Application filed April 18, 1883. (Model.)

*To all whom it may concern:*

Be it known that I, FRANK A. BUELL, of Brooklyn, in the county of Kings and State of New York, have invented a new and Improved Saw-Handle, of which the following is a full, clear, and exact description.

The object of the invention is to avoid any cramping of the fingers, to enable the operator to grasp the handle more firmly than is usually possible, and to accomplish these ends with little or no addition to the cost of manufacture.

Reference is to be had to the accompanying drawings, forming part of this specification, in which similar letters of reference indicate corresponding parts in all the figures.

Figure 1:
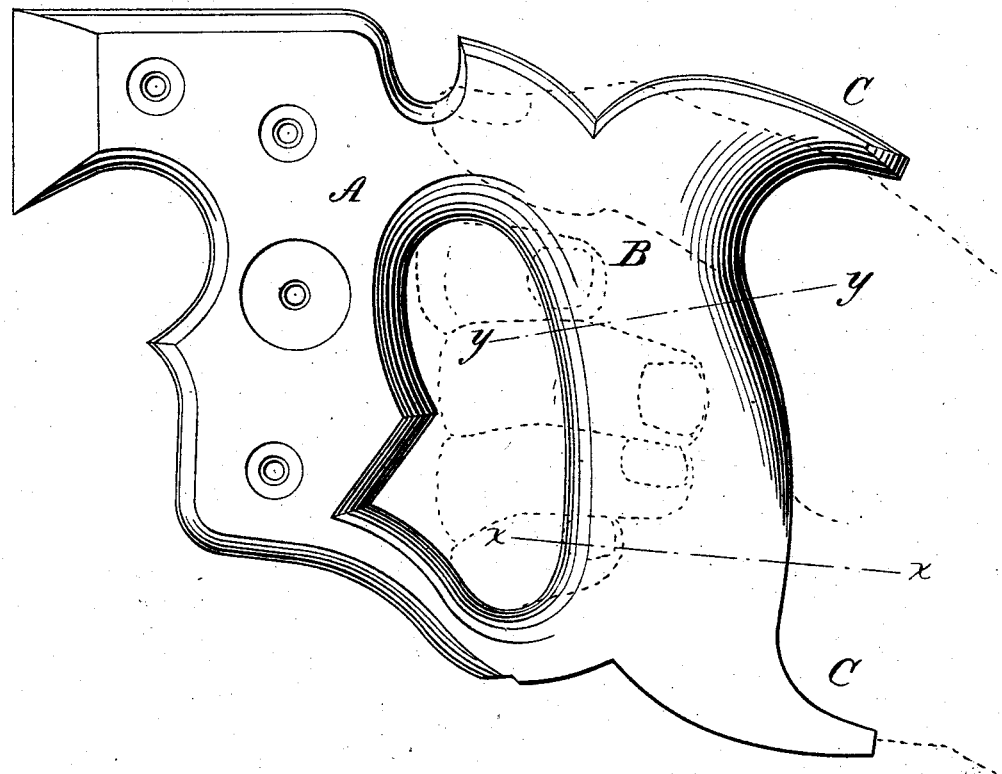
Figure 2:
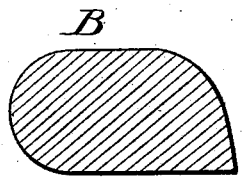
Figure 3:
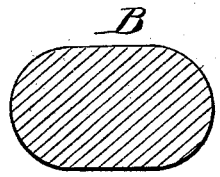

Figure 1 is a side view of my improved saw-handle. Fig. 2 is a cross-sectional view of the same on the line $x\,x$, Fig. 1. Fig. 3 is a cross-sectional view of the same on the line $y\,y$, Fig. 1.

The saw-handle A is provided with a transverse hand-piece, B, and with top and bottom curved prongs C. Usually the inner and outer edges of the hand-piece B are rounded off uniformly to both sides throughout their entire length, as shown in Fig. 3; but if the handle is constructed in this manner, the outer edge of the hand handle-piece will fit closely against the upper part of the palm of the hand grasping the saw-handle; but that part of the palm at the outer lower corner of the same is quite flat, and does not fit well against the lower part of the rounded outer edge of the hand-piece, and thus prevents the operator from getting a good grip on the saw, and makes it quite inconvenient to hold the saw firmly.

In order to construct the handle in such a manner that the hand-piece will fit very closely against the hand and can be gripped very firmly, the lower part of that side of the hand-piece against which the thumb rests is made flat, and the lower part of the outer edge of the hand-piece is beveled off on a curved line from the flat side toward the other side, as shown in section in Fig. 2.

If the hand-piece B is beveled off, in the manner described, at its lower part, it will fit very closely against the lower corner of the palm, and the thumb can be passed around the upper part of the hand handle-piece. The upper prong C is rounded off uniformly toward both sides; but the lower prong C is beveled from one side to the other, the same as the lower part of the hand-piece of the handle.

Having thus described my invention, what I claim as new, and desire to secure by Letters Patent, is—

A saw-handle having the grip beveled at the back of the lower part thereof and the horn from the left side of handle on a slight curve to the right, said bevel being for a distance half the length of the grip and horn, and the grip being also slightly beveled from the right side of the handle to the left, whereby cramping of the fingers will be prevented and a firm grasp allowed, as set forth.

FRANK A. BUELL.

Witnesses:
RICHARD BENTON FRANKLIN,
HARRY B. PEACE.